United States Patent
Barzilai et al.

(10) Patent No.: US 9,571,555 B2
(45) Date of Patent: Feb. 14, 2017

(54) METHODS CIRCUITS DEVICES SYSTEMS AND ASSOCIATED COMPUTER EXECUTABLE CODE FOR WEB AUGMENTATION

(71) Applicant: TOMODO LTD., Tel Aviv (IL)

(72) Inventors: Oren Barzilai, Tel Aviv (IL); Oded Golan, Tel Aviv (IL)

(73) Assignee: TOMODO LTD., Tel Aviv (IL)

( * ) Notice: Subject to any disclaimer, the term of this patent is extended or adjusted under 35 U.S.C. 154(b) by 440 days.

(21) Appl. No.: 14/058,253

(22) Filed: Oct. 20, 2013

(65) Prior Publication Data

US 2014/0181314 A1 Jun. 26, 2014

Related U.S. Application Data

(60) Provisional application No. 61/716,517, filed on Oct. 20, 2012.

(51) Int. Cl.
*G06F 15/16* (2006.01)
*H04L 29/08* (2006.01)

(52) U.S. Cl.
CPC ............. *H04L 67/02* (2013.01); *H04L 67/28* (2013.01); *H04L 67/2823* (2013.01)

(58) Field of Classification Search
CPC .................... H04L 67/28; H04L 67/2823
USPC ........................... 709/203, 217, 227
See application file for complete search history.

(56) References Cited

U.S. PATENT DOCUMENTS

| | | | |
|---|---|---|---|
| 8,799,515 B1* | 8/2014 | Wu | H04L 67/2814 709/219 |
| 2010/0106777 A1* | 4/2010 | Cooper | H04L 67/28 709/203 |
| 2010/0332616 A1* | 12/2010 | Sinha | G06F 17/30867 709/218 |
| 2011/0314091 A1* | 12/2011 | Podjarny | G06F 17/30905 709/203 |
| 2012/0023090 A1* | 1/2012 | Holloway | H04L 63/0281 707/709 |
| 2013/0073609 A1* | 3/2013 | Connolly | G06F 15/16 709/203 |

* cited by examiner

*Primary Examiner* — Jason Recek
(74) *Attorney, Agent, or Firm* — Vladimir Sherman; Professional Patent Solutions

(57) ABSTRACT

Disclosed are methods, circuits, devices, systems and associated computer executable code for generating a web-projection. One or more scripts, defining web-projections, are executed, initiating communication sessions with one or more webpage servers defined in the scripts. Specific content(s) defined in the script, from the one or more webpage servers, is retrieved, translated and injected into corresponding web-projections prior to being served to a requesting client web browser.

15 Claims, 5 Drawing Sheets

METHODS CIRCUITS DEVICES SYSTEMS AND ASSOCIATED COMPUTER EXECUTABLE CODE FOR WEB AUGMENTATION

FIELD OF THE INVENTION

The present invention relates generally to the field of Internet and Web technology. More specifically, the present invention relates to methods, circuits, devices, systems and associated computer executable code for web augmentation.

BACKGROUND

In its basic form, a web browsing user will surf to a website using a web browser by writing/clicking a URL and will be served with a webpage designed by the original website creator. All aspects of such a webpage including the design and functionality are controlled by the original website creator.

Browser plugins are a software component that is installed on a computer and allows for the modification of existing websites by changing the behavior of a user's web browser. After a webpage is served to the user's web browser, the browser plugin can perform actions to manipulate what is presented to the user.

Taking the above into account, there clearly remains a need, in the field of Internet and Web technology, for better more efficient systems and methods for website modification and augmentation that do not rely on software installation as with browser plugins. Such systems and methods may allow for a website to be served under a new URL, allowing for modifications to the original website to be made before the website is served to the end user. Such modifications may apply to the UI and visual elements, to adding functionality to the web page and/or to the building of mash-ups between sites and adding content or functionality to an original website from other websites.

SUMMARY OF THE INVENTION

The present invention includes methods, circuits, devices, systems and associated computer executable code for web augmentation. According to embodiments, there may be provided methods, circuits, devices, systems and associated computer executable code for generating a web-projection (e.g. a webpage accessible at a network address) including one or more live-linked webpage segments from each of one or more linked web sources (e.g. webpages, web services, APIs, SaaS, widgets).

According to further embodiments, the generated web-projection may also include: (1) one or more translations or modifications of webpage elements of live-linked webpages; and (2) one or more new, independent and/or unlinked webpage elements, for example defined by a projection author. According to further embodiments, bidirectional communication between a web browser on which the web-projection is instanced or rendered and a server associated with the one or more linked web sources may be provided, wherein the bidirectional communication may include: (1) http translations of requests from the browser; and (2) http translations of transmissions/responses from the server.

A web-projection generator, according to some embodiments, may include: (1) a web-projection script executor adapted to execute one or more scripts defining each of one or more web-projections associated with (e.g. hosted by) the generator; (2) an http proxy adapted to, responsive to instructions from the generator, initiate and maintain a communication session with one or more webpage servers defined in a script of a given web-projection; and (3) a web server adapted to initiate and maintain communication sessions with one or more web browsers requesting content from a web address associated with a web-projection associated with (e.g. hosted by) the generator.

According to some embodiments, responsive to receiving a page request from a web browser which sent one or more page requests to a given web-projection network address associated with the generator webserver, the script executor may signal or otherwise instruct the http proxy to establish communication sessions, such as live-link connection sessions, and to request webpage segments from servers of one or more linked source webpages defined in the script of the given web-projection.

According to some embodiments, the script executor, or a functionally associated logical module, may translate page requests received from the web browser in accordance with: (1) a script of the given web-projection, and (2) http translation logic which factors and resolves network domain differences between the network domain of the http proxy and the network domain of the web browser. The script executor, or a functionally associated logical module, may translate data/responses received from the servers of one or more linked source webpages in accordance with: (1) a script of the given web-projection, and (2) http translation logic which factors and resolves network domain differences between the network domain of the http proxy and the network domain of the web browser.

According to some embodiments, the web-projection generator, via its webserver, may execute and/or forward to the web browser translated data/responses from the one or more linked source web page servers, presenting a user with: a web-projection also including data/content from a linked source web page server, or a web-projection including a data/content Mash-up (i.e. combination, mixture) based on multiple linked source web page servers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
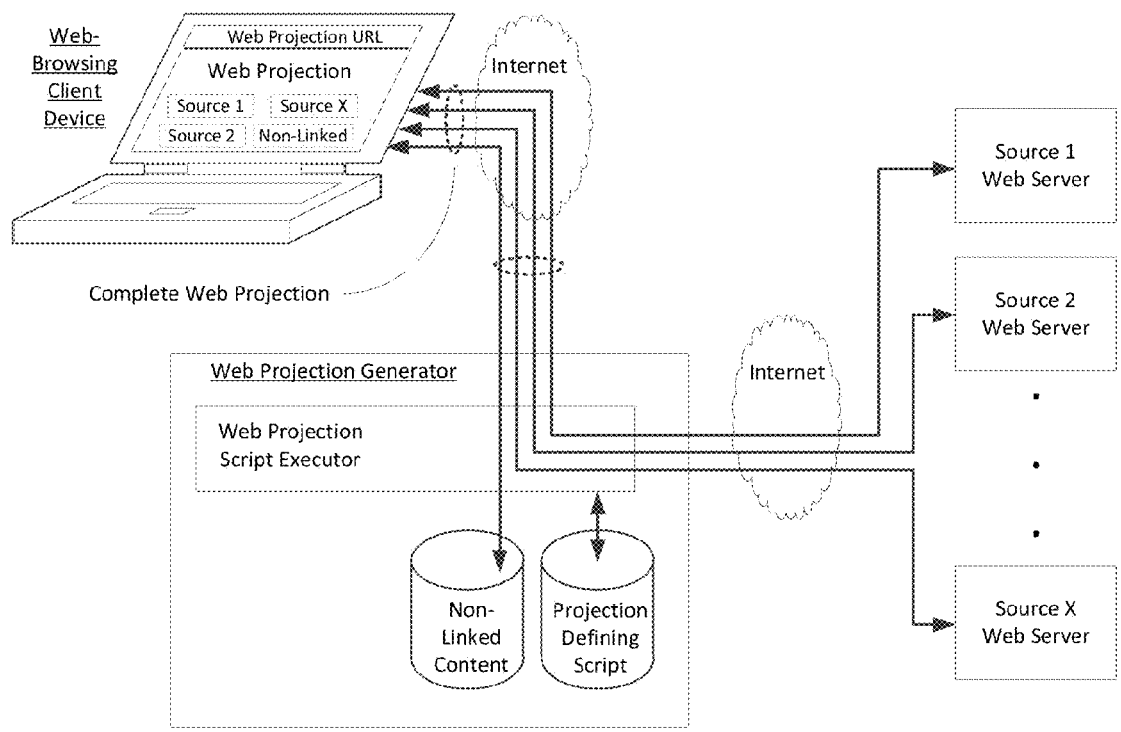
FIG. 1 is a functional block diagram showing the architecture of an exemplary system for web augmentation, in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The present invention includes methods, circuits, devices, systems and associated computer executable code for web augmentation. According to embodiments, there may be provided methods, circuits, devices, systems and associated computer executable code for generating a web-projection (e.g. a webpage accessible at a network address) including one or more live-linked webpage segments from each of one or more linked web sources (e.g. webpages, web services, APIs, SaaS, widgets).

According to further embodiments, the generated web-projection may also include: (1) one or more translations or modifications of webpage elements of live-linked webpages; and (2) one or more new, independent and/or unlinked webpage elements, for example defined by a projection author. According to further embodiments, bidirectional communication between a web browser on which the web-projection is instanced or rendered and a server associated with the one or more linked web sources may be provided, wherein the bidirectional communication may include: (1) http translations of requests from the browser; and (2) http translations of transmissions/responses from the server.

FIG. 1 is a functional block diagram showing the architecture of an exemplary system for web augmentation, in accordance with some embodiments of the present invention. A web browser of a Web-Browsing Client Device sends a Web Projection URL request to a Web Projection Generator. A Web Projection Script Executor references a Projection Defining Script database and executes the scripts matching the requested Web Projection, thus triggering and directing requests for one or more webpage segments from one or more linked web sources. The Web Projection Script Executor then translates, modifies and injects, along with additional Non-Linked Content, the retrieved webpage content segments received in response to the requests made, forming a Complete Web Projection that is rendered on the web browser of the Web-Browsing Client Device.

A web-projection generator, according to some embodiments, may include: (1) a web-projection script executor adapted to execute one or more scripts defining each of one or more web-projections associated with (e.g. hosted by) the generator; (2) an http proxy adapted to, responsive to instructions from the generator, initiate and maintain a communication session with one or more webpage servers defined in a script of a given web-projection; and (3) a web server adapted to initiate and maintain communication sessions with one or more web browsers requesting content from a web address associated with a web-projection associated with (e.g. hosted by) the generator.

Figure 2:
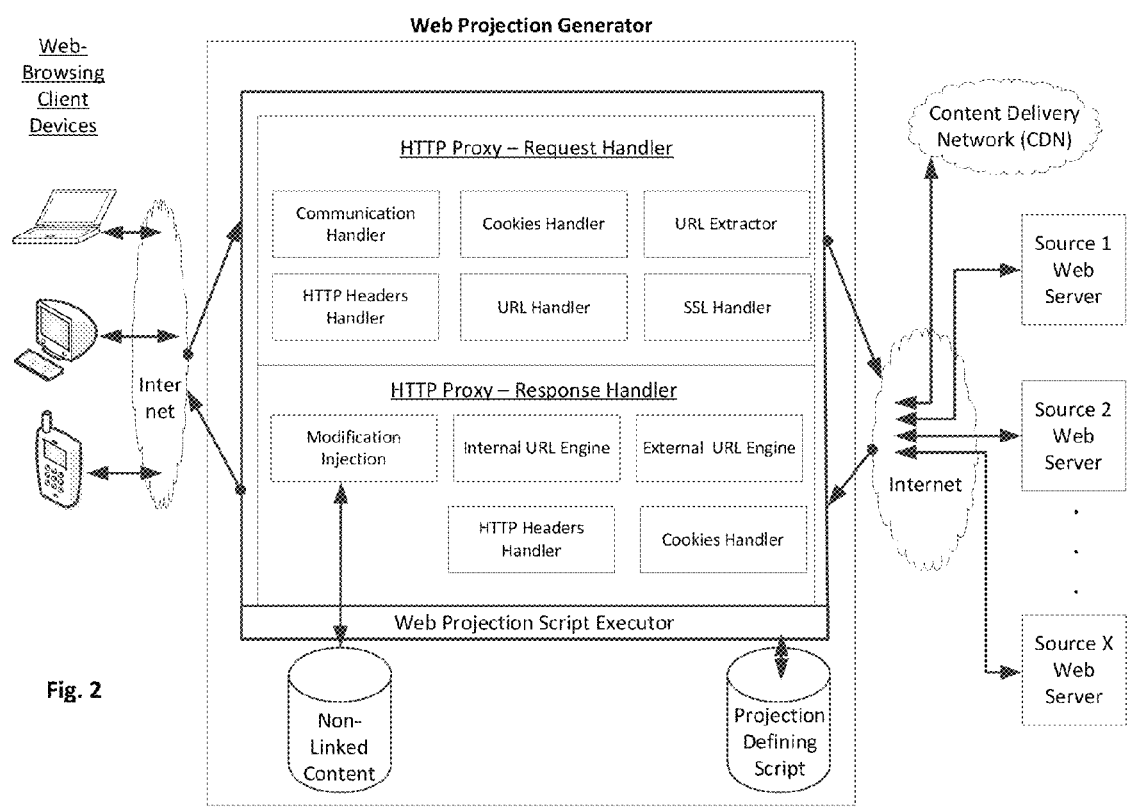
FIG. 2 is a functional block diagram showing the Web Projection Generator of an exemplary system for web augmentation, in accordance with some embodiments of the present invention, in further detail.

FIG. 2 is a functional block diagram showing the Web Projection Generator of an exemplary system for web augmentation, in accordance with some embodiments of the present invention, in further detail.

The exemplary Web Projection Generator shown, includes: (1) a Web-Projection Script Executor for executing one or more scripts defining each of one or more web-projections associated with (e.g. hosted by) the generator; (2) a Request Handler for handling requests from the web browser on which the web-projection is instanced or rendered; and (3) a Response Handler for handling transmissions/responses from the server associated with the one or more linked web sources.

The exemplary Request Handler shown, includes: (a) a URL Extractor for extracting a key embodied into the URL of a requested web projection, which is used for determining what changes are to be made to the corresponding projected webpage and what are the external web sources from which its content is to be requested; (b) a URL Engine for changing or replacing URL links embedded into web page(s) of the modified website forming the basis of the web projection being generated (including all variations of the URLs—e.g. with prefix or without, with http or without, relative/absolute etc.) to their original form; (c) a Cookie Handler for saving cookies of external web sources and web sites, used for generating the web projection, and forwarding them back to the original web sources or web sites as part of handling a web browser request for a web projection based on these sources and sites, thus preserving the normal, cookie dependent, behavior of the external web sources or web sites and/or segments thereof; (d) an HTTP Headers Handler for changing specific HTTP headers to their original form, such that external web source servers see page requests as being accessed from the web-browsing client using their original URL; (e) a Communication Handler for invoking the communication between the system server(s) and the external web sources and website servers from which content segments are to be requested, and for determining the communication type (e.g. GET,POST,PUT,OPTIONS,HEAD), packing the modified request (HTTP headers, cookies, URLS, parameters, etc. handled) and relaying the request to the external web sources and/or websites; and (f) an SSL Handler for managing SSL certificates exchange and handling, between the system server(s) and the servers of external web sources and web sites, and for enabling the access of SSL secured websources or web sites via non-SSL secured, or unsecured, communication and vice versa, and for enabling SSL communication to non-SSL secured or unsecured web sources or web sites.

The exemplary Response Handler shown, includes: (a) an HTTP Headers Handler for changing specific HTTP headers to a changed form, such that web-browsing devices see page responses as being served from the original external web sources or web sites and not rather than the proxy server from which they are actually served; (b) a Cookie Handler for saving cookies of external web sources and web sites, used for generating the web projection, and forwarding them to the web-browsing client as part of handling a response to a web browser request for a web projection based on these sources and sites, thus preserving the normal, cookie dependent, behavior of the external web sources or web sites, and/or segments thereof, when rendered on the client device browser; (c) an External URL Engine for replacing URLs inside JavaScript files of web page resources stored on external domains such as a Content Delivery Network (CDN) by redirecting these files to be served through the proxy server; (d) a Modification Injection Handler for injecting code changes, such as JavaScript code and Cascading Style Sheets (CSS) code, for modifying and changing visual elements of the original web page used for generating the web projection, prior to its serving to the client device web browser; and (e) the URL Engine for (i) distinguishing between external (from external web sources—under a different domain) and internal (from the original web site forming the basis of the web projection being generated—under the same domain) URLs, (ii) changing or replacing URL links embedded into web page segments originating from external web sources (including all variations of the URLs—e.g. with prefix or without, with http or without, relative/absolute etc.) to alternative URL links pointing to the modified web projections built by the Generator, thus preventing users from being redirected back to, or through, the external web pages, and (iii) recognizing, and changing or replacing third party widgets (e.g. a Facebook 'like' click on an article) to point back to the original URL of the original web page they are served from (i.e. the URL on the original page of the abovementioned article) and not to the modified webpage of the web projection being generated.

A Request Handler and/or a Response Handler, in accordance with some embodiments of the present invention, may include any combination, of some or all, of the modules and/or functionalities described in the above 'Request and Response Handlers' examples.

According to some embodiments, responsive to receiving a page request from a web browser which sent one or more page requests to a given web-projection network address associated with the generator webserver, the script executor may signal or otherwise instruct the http proxy to establish communication sessions, such as live-link connection sessions, and to request webpage segments from servers of one or more linked source webpages defined in the script of the given web-projection.

According to some embodiments, the script executor, or a functionally associated logical module, may translate page requests received from the web browser in accordance with: (1) a script of the given web-projection, and (2) http translation logic which factors and resolves network domain differences between the network domain of the http proxy and the network domain of the web browser. The script executor, or a functionally associated logical module, may translate data/responses received from the servers of one or more linked source web pages in accordance with: (1) a script of the given web-projection, and (2) http translation logic which factors and resolves network domain differences between the network domain of the http proxy and the network domain of the web browser.

According to some embodiments, the web-projection generator, via its webserver, may execute and/or forward to the web browser translated data/responses from the one or more linked source web page servers, presenting a user with: a web-projection also including data/content from a linked source web page server, or a web-projection including a data/content Mash-up (i.e. combination, mixture) based on multiple linked source web page servers.

Figure 3A:
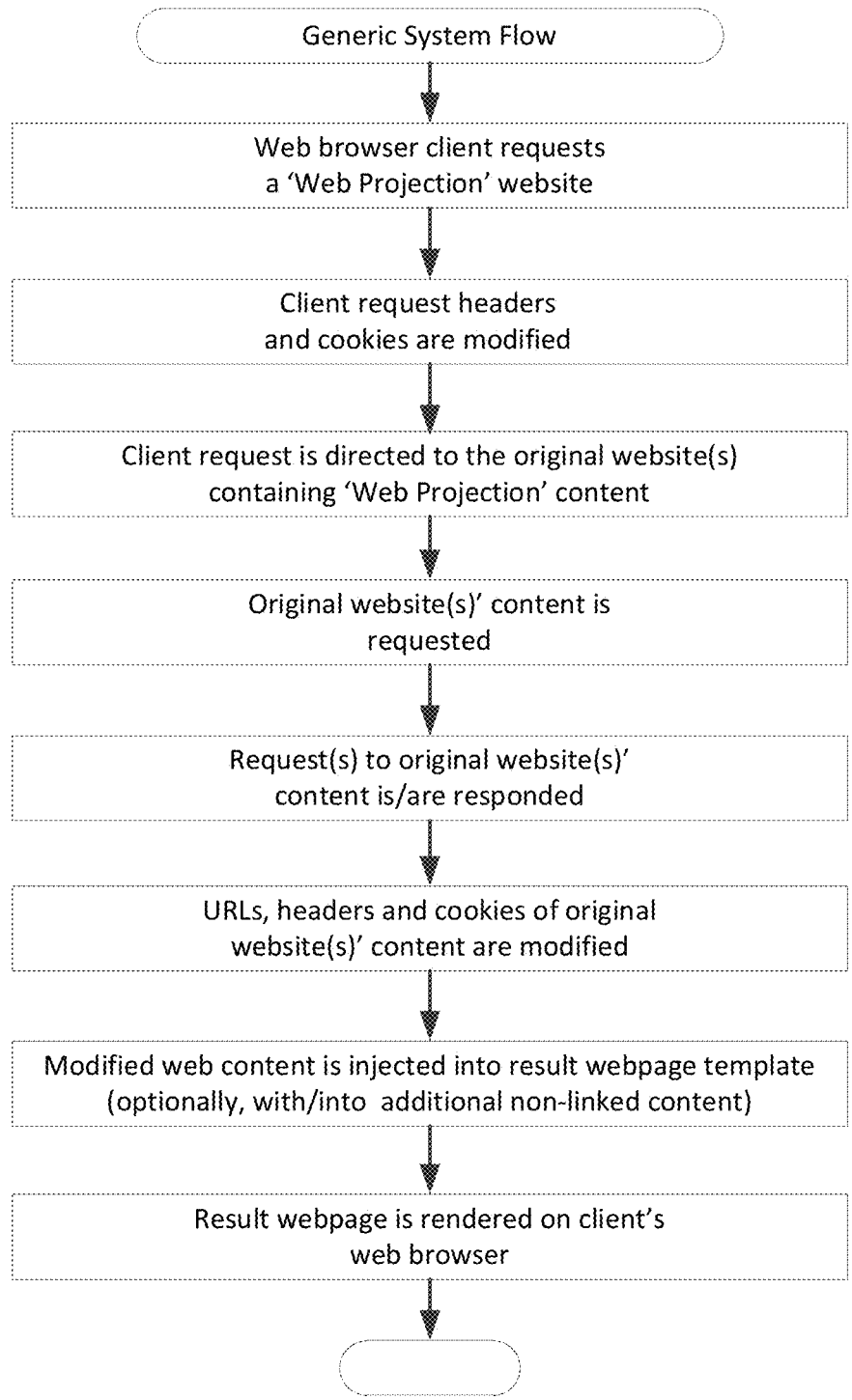
FIG. 3A is a flow chart showing the main steps of a Generic System Flow executed by an exemplary system for web augmentation, in accordance with some embodiments of the present invention.

FIG. 3A is a flow chart showing the main steps of a Generic System Flow executed by an exemplary system for web augmentation, in accordance with some embodiments of the present invention.

Figure 3B:
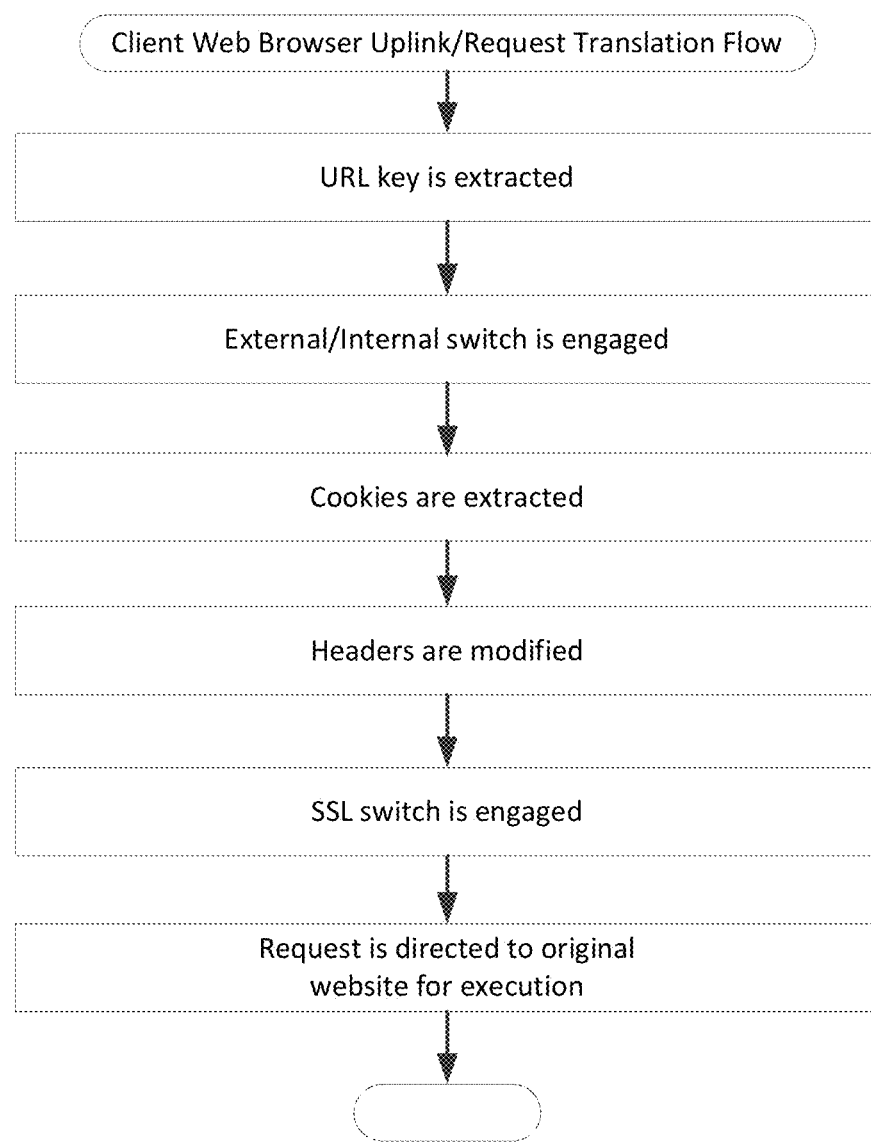
FIG. 3B is a flow chart showing the main steps of a Client Web Browser Uplink/Request Translation Flow executed by an exemplary system for web augmentation, in accordance with some embodiments of the present invention.

FIG. 3B is a flow chart showing the main steps of a Client Web Browser Uplink/Request Translation Flow executed by an exemplary system for web augmentation, in accordance with some embodiments of the present invention.

Figure 3C:
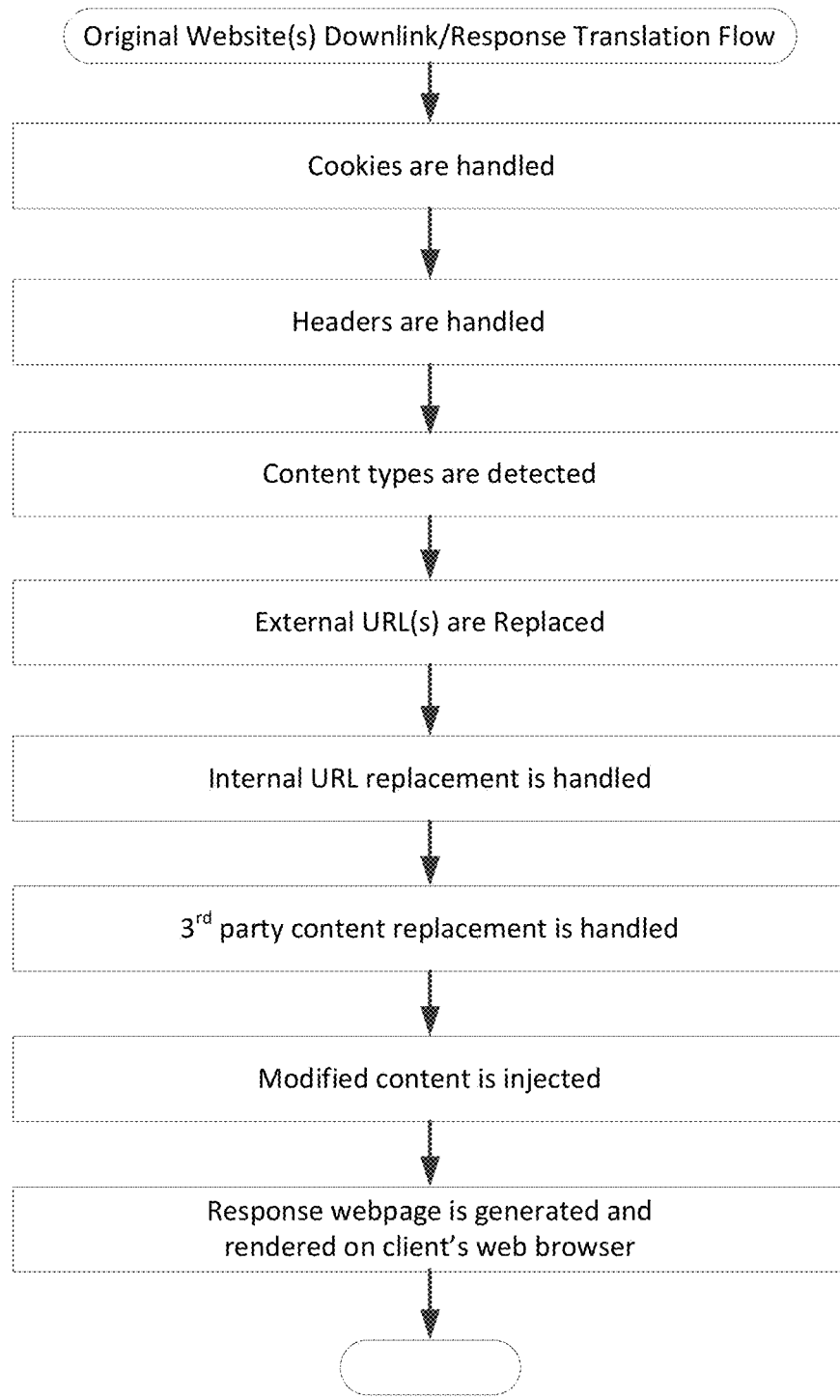
FIG. 3C is a flow chart showing the main steps of an Original Website(s) Downlink/Response Translation Flow executed by an exemplary system for web augmentation, in accordance with some embodiments of the present invention.

FIG. 3C is a flow chart showing the main steps of an Original Website(s) Downlink/Response Translation Flow executed by an exemplary system for web augmentation, in accordance with some embodiments of the present invention.

According to some exemplary embodiments of the present invention, a system for generating a web-projection may comprise: a web-projection script executor adapted to execute one or more scripts defining each of one or more web-projections associated with the system; an http proxy adapted to, responsive to instructions from the generator, initiate and maintain a communication session with one or more source webpage servers defined in a script of a given web-projection; and a web server adapted to initiate and maintain communication sessions with one or more web browsers requesting content from a web address associated with a web-projections associated with the generator.

According to some embodiments, the http proxy may include a request handler adapted to translate a web browser generated request for a given web-projection into one or more requests to one or more source webpage servers defined in a script of the given web-projection.

According to some embodiments, the request handler translation may include one or more of: (1) URL key extraction, (2) external and internal URL handling, (3) cookies handling, (4) http headers handling, and (5) SSL security handling.

According to some embodiments, the request handler may be further adapted to generate one or more web server requests to the one or more source webpage servers defined in the script of the given web-projection.

According to some embodiments, the http proxy may include a response handler adapted to translate one or more responses from one or more source webpage servers defined in a script of a given web-projection into one or more responses addressed to a web browser.

According to some embodiments, the response handler translation may include one or more of: (1) cookies handling, (2) http headers handling (3) content type detection, (4) external and internal URL handling, (5) 3rd party links replacement, and (6) web projection content modification injection.

According to some embodiments, the response may be further adapted to generate a web projection response based on the one or more translated responses.

According to some exemplary embodiments of the present invention, a method for generating a web-projection may comprise: executing one or more scripts defining each of one or more web-projections associated with a given web-projection; initiating and maintaining a live-link communication session with one or more source webpage servers defined in a script of the given web-projection; performing http translation of data received from the one or more source webpage servers; and initiating and maintaining communication sessions with one or more web browsers requesting content from a web address associated with the given web-projection.

According to some embodiments, executing one or more scripts may include translating a web browser generated request for the given web-projection into one or more requests to one or more source webpage servers defined in the script of the given web-projection.

According to some embodiments, translating may include one or more of: (1) URL key extraction, (2) external and internal URL handling, (3) cookies handling, (4) http headers handling, and (5) SSL security handling.

According to some embodiments, executing one or more scripts may further include generating one or more web server requests to the one or more source webpage servers defined in the script of the given web-projection.

According to some embodiments, executing one or more scripts may include translating one or more responses from one or more source webpage servers defined in a script of a given web-projection into one or more responses addressed to a web browser.

According to some embodiments, translating may include one or more of: (1) cookies handling, (2) http headers handling, (3) content type detection, (4) external and internal URL handling, (5) 3rd party links replacement, and (6) web projection content modification injection.

According to some embodiments, executing one or more scripts may further include generating a web projection response based on the one or more translated responses.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed:

1. A system for generating a web-projection comprising:
a Hypertext Transfer Protocol (HTTP) proxy server residing within a first Network-Domain (ND) comprising:
  a projection defining script database containing web projection scripts;
  a request handler comprising:
    a. communication circuitry adapted to receive, from client browsers residing outside the first ND, requests for projections of modified web content, embodied as projection web addresses within the first ND, each given projection web address including one or more keys identifying: (i) one or more source web pages associated with the given projection web address, and (ii) a given web projection script associated with the given projection web address,
      wherein the source web pages reside within a second ND distinct from the first ND; and
    b. processing circuitry adapted to extract, from each given projection web address received from client browsers: (i) the one or more given source web pages identified by the given projection web address and (ii) the given web projection script, identified by the given projection web address, which given web projection script includes a given set of instructions for modifying the one or more given source web pages;
  a web-projection script executor adapted to execute each of the identified web projection scripts;
  second communication circuitry adapted to retrieve, in real time, code of each of the one or more given source web pages, including domain specific code elements of the given source web pages functional only when served from a webserver residing within the second ND; and
  a web page projection generator adapted to generate, from each given retrieved code, web page projections comprising elements of the given source web pages, each modified according to a respective given web projection script, wherein generating web page projections includes modifying, in real time, the domain specific code elements of each given source web page to render the domain specific code elements functional within the first ND; and
  a webserver adapted to serve to the client browsers requesting modified web content, the generated web page projections, from the first ND.

2. The system according to claim 1, wherein said request handler is further adapted to translate each given request for a projection of modified web content, into one or more requests to one or more source webpage servers defined in the given web-projection script.

3. The system according to claim 1, wherein modifying, in real time, the retrieved code elements of each given source web page to render the domain specific code elements functional within the first ND includes: (1) external and internal URL handling, (2) cookies handling, and (3) http headers handling.

4. The system according to claim 1, wherein each given projection web address defined in each given request for projections of modified web content is a URL address including an identifier of a given source web page.

5. The system according to claim 1, wherein modifying, in real time, the retrieved code elements of each given source web page to render the domain specific code elements functional within the first ND includes changing or replacing URL links embedded into the given source web page.

6. The system according to claim 1, wherein modifying, in real time, the retrieved code elements of each given source web page to render the domain specific code elements functional within the first ND includes $3^{rd}$ party link replacement.

7. The system according to claim 6, wherein modifying, in real time, the retrieved code elements of each given source web page to render the domain specific code elements functional within the first ND includes changing specific HTTP headers to their original form.

8. A method for generating a web-projection comprising:
maintaining a projection defining script database containing web projection scripts;
receiving by a Hypertext Transfer Protocol HTTP proxy server residing within a first Network domain, from client browsers residing outside the first Network domain, requests for projections of modified web content, embodied as projection web addresses within the first Network domain, each given projection web address including one or more keys identifying: one or more source web pages associated with the given projection web address and a given web projection script associated with the given projection web address, wherein the source web pages reside within a second domain, distinct from the first domain;
automatically extracting, from each given web address defined in each given projection web address received from client browsers:
(i) the one or more given source web pages identified by the given projection web address and (ii) the given web projection script, identified by the given projection web address, which given web projection script includes a given set of instructions for modifying the one or more given source web pages;
executing each of the identified web projection scripts by:
retrieving, in real time, code of each of the one or more given source web pages, including domain specific code elements of the given source web pages functional only when served from a webserver residing within the second domain; and
generating, from the retrieved code, web page projections comprising elements of the given source web pages, each modified according to a respective given web projection script, wherein generating web page projections includes modifying, in real time, the domain specific code elements of each given source web page to render it functional within the first domain; and
using a webserver to serve to the client browsers requesting modified web content, from the first domain, the generated web page projections.

9. The method according to claim 8, further comprising translating each given request for a projection of modified web content into requests to one or more source webpage servers defined in the given web-projection script.

10. The method according to claim 8, wherein modifying, in real time, the retrieved code elements of each given source web page to render the domain specific code elements functional within the first ND includes (1) external and internal URL handling, (2) cookies handling, and (3) http headers handling.

11. The method according to claim 8, wherein each given projection web address defined in each given request for projections of modified web content is a URL address including an identifier of a given source web page.

12. The method according to claim 8, wherein modifying, in real time, the retrieved code elements of each given source web page to render the domain specific code elements functional within the first ND includes changing or replacing URL links embedded into the given source web page.

13. The method according to claim 8, wherein modifying, in real time, the retrieved code elements of each given source web page to render the domain specific code elements functional within the first ND includes $3^{rd}$ party link replacement.

14. The method according to claim 8, wherein modifying, in real time, the retrieved code elements of each given source web page to render the domain specific code elements functional within the first ND includes changing specific HTTP headers to their original form.

15. A system for generating a web-projection comprising:
a Hypertext Transfer Protocol (HTTP) proxy server residing within a first Network-Domain (ND) comprising:
a projection defining script database containing web projection scripts;
a request handler comprising:
a. communication circuitry adapted to receive, from client browsers residing outside the first ND, requests for projections of modified web content, embodied as projection web addresses within the first ND, each given projection web address including one or more keys identifying: one or more source web pages associated with the given projection web address and a given web projection script associated with the given projection web address,
wherein the source web pages reside within a second ND, distinct from the first ND; and
b. processing circuitry adapted to extract, from each given projection web address received from client browsers: (i) the one or more given source web pages identified by the given projection web address and (ii) the given web projection script, identified by the given projection web address, which given web projection script includes a given set of instructions for modifying the one or more given source web pages;
a web-projection script executor adapted to execute each of the identified web projection scripts;
second communication circuitry adapted to retrieve, in real time, code of each of the one or more given source web pages, including domain specific code elements of the given source web pages referring to a Uniform Resource Locator (URL) within the second ND; and
a web page projection generator adapted to generate, from each given retrieved code, web page projections comprising elements of the given source web pages, each modified according to a respective given web projection script, wherein generating web page projections includes modifying, in real time, the domain specific code elements of each given source web page to refer to a new URL within the first ND; and
a webserver adapted to serve to the client browsers requesting modified web content, the generated web page projections, from the first ND.

* * * * *